US006493802B1

United States Patent
Razdan et al.

(10) Patent No.: US 6,493,802 B1
(45) Date of Patent: Dec. 10, 2002

(54) METHOD AND APPARATUS FOR PERFORMING SPECULATIVE MEMORY FILLS INTO A MICROPROCESSOR

(75) Inventors: Rahul Razdan, Princeton, MA (US); James B. Keller, Waltham, MA (US); Richard E. Kessler, Shrewsbury, MA (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/099,396

(22) Filed: Jun. 18, 1998

(51) Int. Cl.[7] .............................................. G06F 12/12
(52) U.S. Cl. ....................... 711/144; 711/141; 711/146; 712/233; 712/239
(58) Field of Search .................................. 711/144, 204, 711/213, 141, 145; 712/233, 234, 235, 236, 237, 238, 239, 240, 23

(56) References Cited

U.S. PATENT DOCUMENTS

| | | | |
|---|---|---|---|
| 5,504,874 A | 4/1996 | Galles et al. ................ 395/472 |
| 5,603,010 A | 2/1997 | Dodd et al. .................. 395/494 |
| 5,623,628 A | * 4/1997 | Brayton et al. ............. 711/141 |
| 5,634,068 A | 5/1997 | Nishtala et al. ............. 395/800 |
| 5,644,753 A | 7/1997 | Ebrahim et al. ............ 395/458 |
| 5,651,137 A | 7/1997 | MacWilliams et al. ..... 395/468 |
| 5,680,576 A | 10/1997 | Laudon ....................... 395/472 |
| 5,713,004 A | 1/1998 | Kimmel et al. ............. 395/472 |
| 5,751,995 A | * 5/1998 | Sarangdhar ................. 711/145 |
| 5,829,036 A | 10/1998 | Klein .......................... 711/141 |
| 5,838,943 A | 11/1998 | Ramagopal et al. ........ 395/394 |
| 5,951,671 A | * 9/1999 | Green ........................... 712/23 |
| 5,956,753 A | 9/1999 | Glew et al. .................. 711/205 |
| 6,085,294 A | 7/2000 | Van Doren et al. ......... 711/144 |
| 6,314,496 B1 | 11/2001 | Razdan et al. .............. 711/141 |

OTHER PUBLICATIONS

*Method And Apparatus For Performing Speculative Memory References To The Memory Interface*, Razdan et al, U.S. patent application Ser. No. 09/099,399, filed Jun. 18, 1998.
*Method And Apparatus For Developing Multiprocessor Cache Control Protocols Using An External Acknowledgment Signal To Set A Cache To A Dirty State*, Razdan et al, U.S. patent application Ser. No. 09/099,384, filed Jun. 18, 1998.

* cited by examiner

Primary Examiner—Behzad James Peikari
Assistant Examiner—Pierre M. Vital
(74) Attorney, Agent, or Firm—Conley, Rose & Tayon, P.C.

(57) ABSTRACT

According to the present invention a cache within a multi-processor system is speculatively filled. To speculatively fill a designated cache, the present invention first determines an address which identifies information located in a main memory. The address may also identify one or more other versions of the information located in one or more caches. The process of filling the designated cache with the information is started by locating the information in the main memory and locating other versions of the information identified by the address in the caches. The validity of the information located in the main memory is determined after locating the other versions of the information. The process of filling the designated cache with the information located in the main memory is initiated before determining the validity of the information located in main memory. Thus, the memory reference is speculative.

21 Claims, 3 Drawing Sheets

METHOD AND APPARATUS FOR PERFORMING SPECULATIVE MEMORY FILLS INTO A MICROPROCESSOR

CROSS-REFERENCE TO RELATED APPLICATIONS

This Application relates to the applications entitled:

METHOD AND APPARATUS FOR PERFORMING SPECULATIVE MEMORY REFERENCES TO THE MEMORY INTERFACE (U.S. application Ser. No. 09/099, 399, filed Jun. 18, 1998) and METHOD AND APPARATUS FOR RESOLVING PROBES IN MULTIPROCESSOR SYSTEMS WHICH DO NOT USE EXTERNAL DUPLICATE TAGS FOR PROBE FILTERING (U.S. application Ser. No. 09/099,400, filed Jun. 18, 1998) and METHOD AND APPARATUS FOR MINIMIZING PIN-COUNT NEEDED BY EXTERNAL MEMORY CONTROL CHIP FOR MULTIPROCESSORS WITH LIMITED MEMORY SIZE REQUIREMENTS (U.S. application Ser. No. 09/099,383, filed Jun. 18, 1998) and METHOD AND APPARATUS FOR DEVELOPING MULTIPROCESSOR CACHE CONTROL PROTOCOLS USING ATOMIC PROBE COMMANDS AND SYSTEM DATA CONTROL RESPONSE COMMANDS (U.S. application Ser. No. 09/099,398, filed Jun. 18, 1998) and METHOD AND APPARATUS FOR DEVELOPING MULTIPROCESSOR CACHE CONTROL PROTOCOLS USING AN EXTERNAL ACKNOWLEDGMENT SIGNAL TO SET A CACHE TO A DIRTY STATE (U.S. application Ser. No. 09/099,384, filed Jun. 18, 1998) and METHOD AND APPARATUS FOR DEVELOPING MULTIPROCESSOR CACHE CONTROL PROTOCOLS BY PRESENTING A CLEAN VICTIM SIGNAL TO AN EXTERNAL SYSTEM (U.S. application Ser. No. 09/099, 304, filed Jun. 18, 1998) and METHOD AND APPARATUS FOR DEVELOPING MULTIPROCESSOR CACHE CONTROL PROTOCOLS USING A MEMORY MANAGEMENT SYSTEM GENERATING ATOMIC PROBE COMMANDS AND SYSTEM DATA CONTROL RESPONSE COMMANDS (U.S. application Ser. No. 09/099,385, filed Jun. 18, 1998) and METHOD AND APPARATUS FOR DEVELOPING MULTIPROCESSOR CACHE CONTROL PROTOCOLS USING A MEMORY MANAGEMENT SYSTEM GENERATING AN EXTERNAL ACKNOWLEDGMENT SIGNAL TO SET A CACHE TO A DIRTY COHERENCE STATE (U.S. application Ser. No. 09/099,386, filed Jun. 18, 1998) and METHOD AND APPARATUS FOR DEVELOPING MULTIPROCESSOR CACHE CONTROL PROTOCOLS USING A MEMORY MANAGEMENT SYSTEM TO RECEIVE A CLEAN VICTIM SIGNAL (U.S. application Ser. No. 09/099,387, filed Jun. 18, 1998).

These applications are filed simultaneously herewith in the U.S. Patent & Trademark Office.

TECHNICAL FIELD

The present invention relates generally to computer processor technology. In particular, the present invention relates to memory access transactions within a computer system having a main memory and one or more cache memories.

BACKGROUND ART

A popular multiprocessor computer architecture is formed by coupling one or more processors to a shared main memory storing data, with each processor typically having a local cache to store its own private copy of a subset of the data from the main memory. An important operation to optimize in any computer system, including a multiprocessor system, is the memory access. The memory access time may create a bottleneck impeding performance of a multiprocessor system, especially in the situation where the processor executes its instructions at a faster rate than the memory rate.

A processor executing a memory access seeks to locate the most recent copy of data which may be stored in the main memory or one of the caches. A typical memory reference to retrieve data in a multiprocessor system is resolved by fetching data from the main memory and concurrently probing the caches of the other processors for any other copy of the data and from this information determining the most recent valid copy of the data.

In order to achieve a high performance in a multiprocessor system, the memory reference process to retrieve data is designed to be completed within a specified memory resolution time interval. However, there are two factors which make this specification difficult to achieve. First, in a memory reference, all of the references to the various memories may not take the same amount of time with some references taking longer than others. Sometimes, the return of data from a reference to main memory is faster than the return of data from the probe to a cache. Thus, it is not known definitively which copy of data is the valid copy until the slowest copy is retrieved.

Next, a high performance processor typically employs highly pipelined designs to aggressively reduce the cycle time of the processor. One ramification of highly pipelined designs is that before a fill to a processor's cache memory can occur, the pipeline must be primed to prepare the pipeline for data reception. This requires a lead-off notice time to schedule the internal resources of the pipeline. This lead-off time further reduces the amount of time available for the multiprocessor system to completely resolve the memory reference from all possible sources of the data.

Thus, a solution is needed to reduce the memory resolution time interval which would subsequently reduce the time for memory access.

SUMMARY DISCLOSURE OF THE INVENTION

According to the present invention a cache within a multiprocessor system is speculatively filled. The multiprocessor system includes a main memory coupled to a plurality of processors having a plurality of caches. Each processor may have one or more internal or external caches. To speculatively fill a designated cache, the present invention first determines an address which identifies information located in the main memory. The address may also identify one or more other versions of the information located in one or more of the caches. The process of filling the designated cache with the information is started by locating the information in the main memory and thus locating other versions of the information identified by the address in the caches. The validity of the information located in the main memory is determined after locating the other versions of the information. The process of filling the designated cache with the information located in the main memory is initiated before determining the validity of the information located in main memory. Thus, the memory reference is speculative.

Typically, the information located in the main memory is invalid if one of the other versions of the information is a more recent, e.g., more current, version than the information located in the main memory, and is valid if the information located in the main memory is more recent than the other versions of the information. More generally, the validity of the information located in the main memory may be determined to be invalid or valid based upon a cache protocol. The process of filling the designated cache is canceled after determining that the information located in the main memory is invalid.

Beneficially, the process of filling the designated cache has a primer stage, wherein a pipeline associated with the filling process is prepared for delivery of the information located in the main memory, followed by a delivery stage, wherein the information located in the main memory is delivered to the designated cache. The process of filling the designated cache is canceled upon determination that the information located in the main memory is invalid before the information located in the main memory is delivered to the designated cache in the delivery stage. The process of filling the designated cache is completed without interruption after determining that the information in the main memory is valid.

In accordance with other aspects of the present invention, a computer system includes a main memory and a computing apparatus connectable to a cache. The cache may be internal or external to the computing apparatus. The computing apparatus includes address circuitry for presenting an address to the main memory. The computing apparatus also includes cache fill circuitry for receiving information from the main memory corresponding to the address and for speculatively filling a section of the cache with the information. The computing apparatus additionally includes validation circuitry for receiving a validation signal having a value indicating whether the main memory information is valid or invalid. The cache fill circuitry initiates a speculative fill of the cache with the main memory information before the validation circuitry receives the validation signal.

The computing apparatus advantageously includes cache fill abort circuitry for canceling the filling of the section of the cache with the main memory information if the value of the validation signal indicates the main memory information is invalid, or for allowing the filling of the section of cache to continue if the value of the validation signal indicates that the main memory information is valid. The value of the validation signal is determined after the cache fill circuitry begins filling the cache with information. Thus, the cache fill is speculative.

The cache fill circuitry may be configured as a pipeline. Beneficially, the cache fill circuitry includes a data setup stage for preparing the main memory information for delivery to the cache, and a data delivery stage for receiving the main memory information from the data setup stage and delivering the main memory information to the cache. If the value of the validation signal indicates that the main memory information is invalid, the process of filling the cache is canceled by the cache fill abort circuitry before the main memory information is received by the information delivery stage.

In a further embodiment, the computing apparatus may also include a memory controller for receiving the address from the address circuitry, locating the main memory information corresponding to the address and providing the main memory information to the cache fill circuitry. Typically, the memory controller sets the value of the validation signal to indicate the main memory information is invalid if the main memory information is not the most recent version of the information. Generally, the memory controller sets the value of the validation signal based upon a cache protocol.

In accordance with still other aspects of the present invention, a multiprocessor system includes a main memory configured to store information, a memory controller, coupled to the main memory, and a plurality of processors, each processor coupled to the memory controller. A processor includes a cache and a system port configured to receive main memory information from the memory controller. Each processor also includes cache fill circuitry for filling a section of the cache with the main memory information, validation circuitry for receiving a validation signal having a value indicating whether the main memory information is valid or invalid, and cache fill abort circuitry for canceling the filling of the section of the cache if the value of the validation signal indicates the main memory information is invalid. The value of the validation signal is determined after the point in time when the cache fill circuitry begins the process of filling the cache with the main memory information, the cache fill is thereby considered to be speculative.

The memory controller retrieves the main memory information from the main memory and generates the validation signal by setting the value of the validation signal to invalid if a more recent version, e.g. a more recent copy, of the information than that in the main memory is located in one of the caches, or setting the value of the validation signal to valid if the copy of the information in memory is the most recent version.

According to yet other aspects of the present invention, a computer system includes a memory reference unit for selecting an address identifying a selected section of information in a memory, an address bus for supplying an external system, typically, a memory controller, with the address for the selected section of information, and an information bus for receiving the selected section of information from the external system in response to the address. The computer system further includes a cache for storing sections of information from the memory, a validation pin for receiving a validation signal indicating whether the selected section of information is valid or invalid according to a cache protocol, and cache fill circuitry for filling one of the sections of the cache with the selected section of information. The cache fill process is initiated before determining if the selected section of information is valid or invalid.

Further, the computer system includes cache fill abort circuitry for canceling the filling of the selected section of the cache if the validation signal indicates the information is invalid. The validity of the selected section of information is determined at a point in time after the point in time when the cache fill circuitry begins filling the cache with the information. Thus, the cache fill is speculative.

Objects, advantages, novel features of the present invention will become apparent to those skilled in the art from this disclosure, including the following detailed description, as well as by practice of the invention. While the invention is described below with reference to a preferred embodiment (s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

BEST MODE FOR CARRYING OUT THE INVENTION

Figure 1:
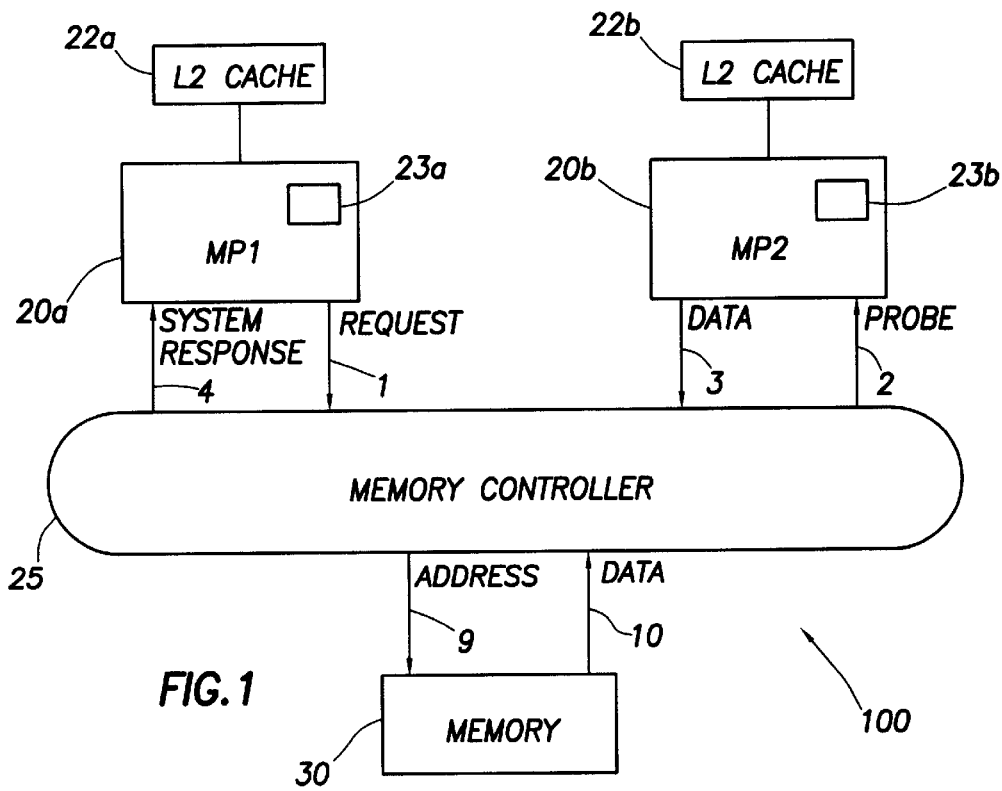
FIG. 1 is a multiprocessor shared memory system in accordance with the present invention.

FIG. 1 illustrates a multiprocessor system 100 which includes two or more processors 20, a memory controller 25 and a main memory 30. In the preferred embodiment, the processors 20 are microprocessors. In FIG. 1, two processors MP1 20a and MP2 20b are shown for the purpose of illustration, but such a multiprocessor system may have two or more processors. In the preferred embodiment, a processor 20 may have more than one cache, including separate caches for instructions (not shown) and data. A cache may further be distinguished as being on the same chip (L1 cache) as the processor or externally connected to the processor chip via a cache bus (L2 cache). FIG. 1 shows processor 20a coupled to L2 cache 22a and containing internal L1 cache 23a. Processor 20b is coupled to external cache 22b and contains internal L1 cache 23b.

Preferably, the memory 30 is a group of main memory modules holding memory shared by the processors of the multiprocessor system 25. The memory 30 forms a common address space referenced by the processors 20.

The memory controller 25 contains data and address buses for coupling the microprocessors and memory, as well as additional logic for implementing a coherence protocol for assuring the coherency of data distributed throughout the main memory 30 and caches 22 and 23. The memory controller 25 implements a particular cache coherence protocol chosen by a system designer for the multiprocessor system. The memory controller 25 may range in complexity from simple to complex depending on the particular protocol implemented. The memory controller 25 could be a single bus or switch system connecting the processors to main memory with additional logic added to implement the protocol. The memory controller could, for example, have its own processor and additional data structures needed to implement a directory cache protocol. Cache protocols, such as the directory cache protocol, are well known to one of ordinary skill in the computing arts.

In one possible implementation of a multiprocessor cache control protocol according to the present invention, in a typical memory access sequence, microprocessor 20a makes a memory request 1 to memory controller 25 requesting a block of memory from main memory 30. The memory controller 25 converts memory request 1 into a probe 2 and sends probe 2 to each microprocessor 20b to determine whether the memory block is present in one of the caches. In this example, the memory block is in cache 22b or 23b of microprocessor 20b, and thus microprocessor 20b issues a probe response 3 returning the block of data 3 to the memory controller 25. The memory controller 25 then forms a system response 4 sending the block to microprocessor 20a which originally requested it. Alternately, if the block was not present in any of the caches, the memory controller 25 would retrieve the memory block 10 corresponding to address 9 from main memory 30 and transfers it by the system response 4 to the requesting microprocessor 20a. Thus, in this particular protocol, before the system 25 checks the main memory 30, it first checks the memory from each cache of the other processors to make sure that the request gets the latest copy.

Figure 2:
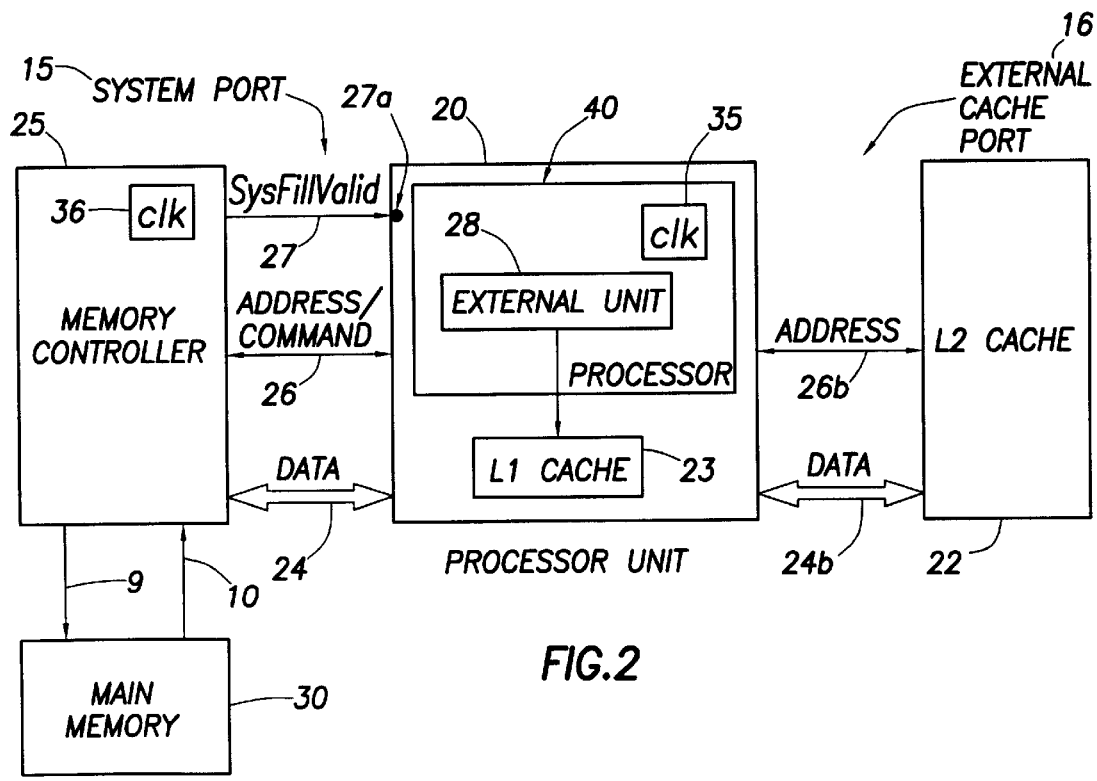
FIG. 2 is a block diagram of a computer system with an L1 and L2 cache in accordance with the present invention.

FIG. 2 shows a computer system having a processor unit (or microprocessor) 20, a memory controller 25, a main memory 30, and an L2 cache 22. The processor unit 20 transmits and receives information from memory controller 25 via system port 15. System port 15 includes a address/command bus 26, a data bus 24, and a validation line 27 for communicating with the memory controller 25. Generally, the system port 15 may interface with an external system, that is, any system linking the processor unit 20 to the external world. The memory controller is a type of external system.

The processor unit 20 transmits and receives information from an external L2 cache 22 via the external cache port 16. The external cache port 16 includes an address bus 26b and a data bus 24b.

The external cache port 16 connects the processor unit 20 to an external cache 22, commonly referred to as the L2 cache. The external cache port 16 includes bidirectional data bus 24b and an address bus 26b. Processor unit 20 contains a processor 40 coupled to an L1 cache 23. In a preferred embodiment, processor 40 and L1 cache 23 are embedded on the same processor chip (denoted herein as processor unit 20), and the L2 cache is a separate chip or chips located externally to the processor chip and connected to the processor chip through cache port 16.

The system port 15 is composed of a bidirectional data bus 24, a bidirectional address/command bus 26, and a validation line 27 transmitting a fill-validation signal (SysFillValid) to processor unit 20. The validation line 27 connects to processor unit 20 at pin 27a. The bidirectional address/command bus 26 transmits both command and address information (in both directions) between the memory controller 25 and the processor unit 20. The command and address information is multiplexed onto a single bidirectional address/command bus in order to reduce pin count on the processor chip.

The memory controller 25 interfaces the processor unit 20 to the main memory 30. The memory controller 25 references main memory 30 via an address bus 9 and receives data from main memory via a data bus 10.

Memory controller 25 has an external data clock 36 which runs data over the data port 24 at clock rate R. Processor unit 20 has an internal clock 35 which runs the internal system at clock rate S. In the present embodiment, the clock rates R and S are not identical. The processor unit's internal clock rate S is 1.5 times faster than the memory controller's external data clock rate R. Consequently, it takes three internal clock cycles of clock 35 to equal two external clock cycles of clock 36.

When the processor unit 20 desires to access main memory 30 to retrieve data, the external unit 28 generates an external memory reference in the form of a command to the memory controller 25 through the address/command bus 26. The external memory reference typically includes a command opcode specifying the type of memory reference and an address pointing to a location in memory. The memory controller 25 handles the command by transmitting the address via the address bus 9 and retrieving the data from main memory 30 over the data bus 10. The memory controller 25 then transmits the data to the processor 20 on the data bus 24.

Figure 3:
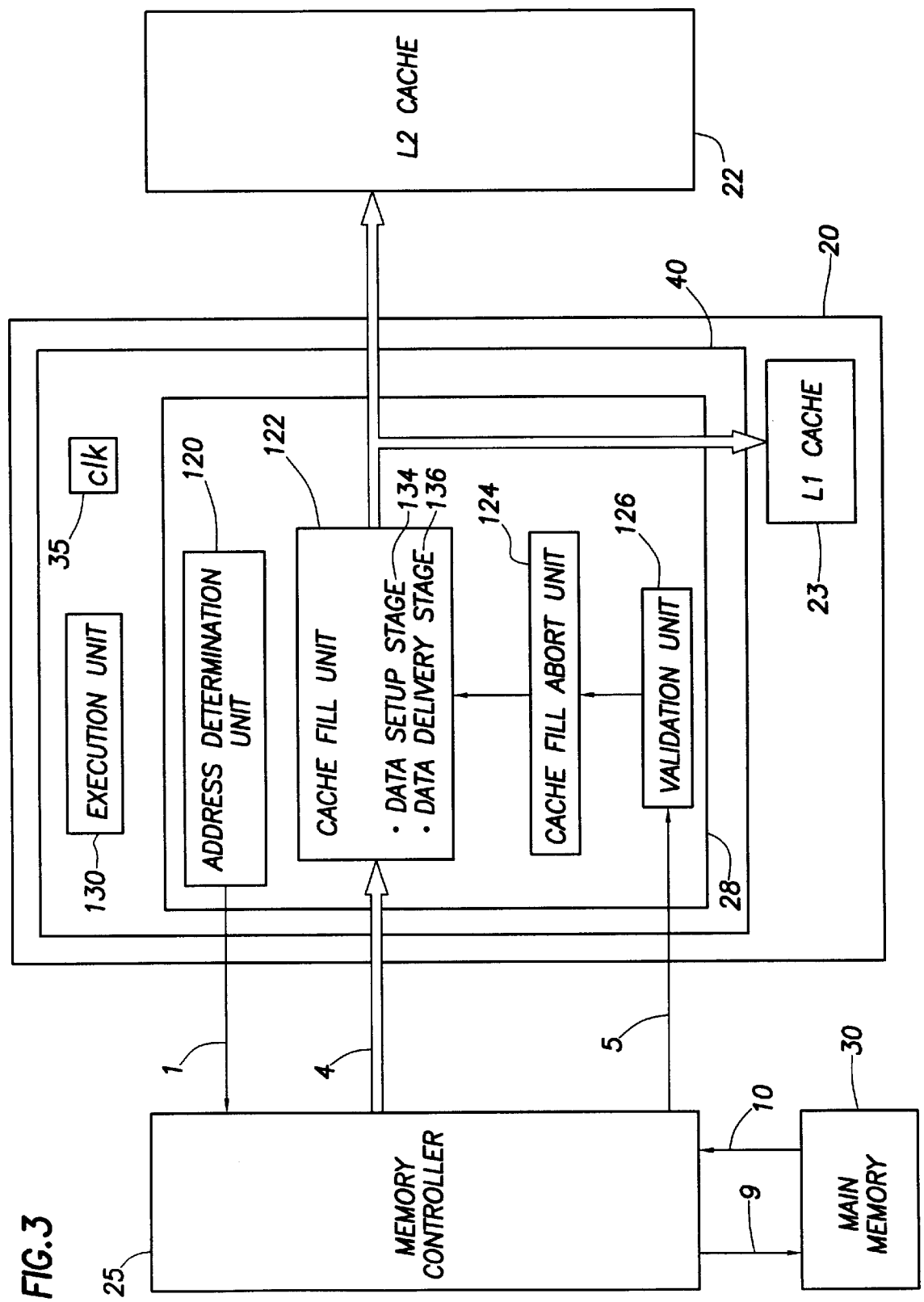
FIG. 3 is a block diagram illustrating a processor having components for implementing a speculative cache fill according to the present invention.

FIG. 3 shows processor unit 20 including processor 40 and L1 cache 23. Referring to FIG. 3, processor 40 includes execution unit 130, clock 35, and external unit 28. FIG. 3 depicts a particular arrangement of processor functions pertinent to the present invention and is not intended to preclude other arrangements of those functions. For example, circuitry for the address determination unit 120 could be partially located in the execution 130. In the preferred embodiment of the present invention, the circuitry of processor 40 is implemented as a pipelined architecture familiar to one of skill in the computer arts.

Execution unit 130 denotes components of processor 40 typically associated with the central processing unit of a computer, such as instruction fetch circuitry, instruction control circuitry, internal registers, and arithmetic logic units.

External unit 28 generally includes circuitry which controls memory transactions between processor 40 and the memory controller 25, L1 cache 23, and L2 cache 22. External unit 28 includes components of processor 40 associated with implementing a speculative cache fill according to the present invention, including an address determination unit 120, a cache fill unit 122, a cache abort unit 124 and a validation unit 126. The cache fill unit 122 is configured as a pipeline and includes a data setup stage 134 followed by a data delivery stage 136.

The present invention provides a process to initiate a cache fill based on the timing of main memory and a multiprocessor determined lead-off time, and then cancel this fill at the actual point of data delivery.

Figure 4:
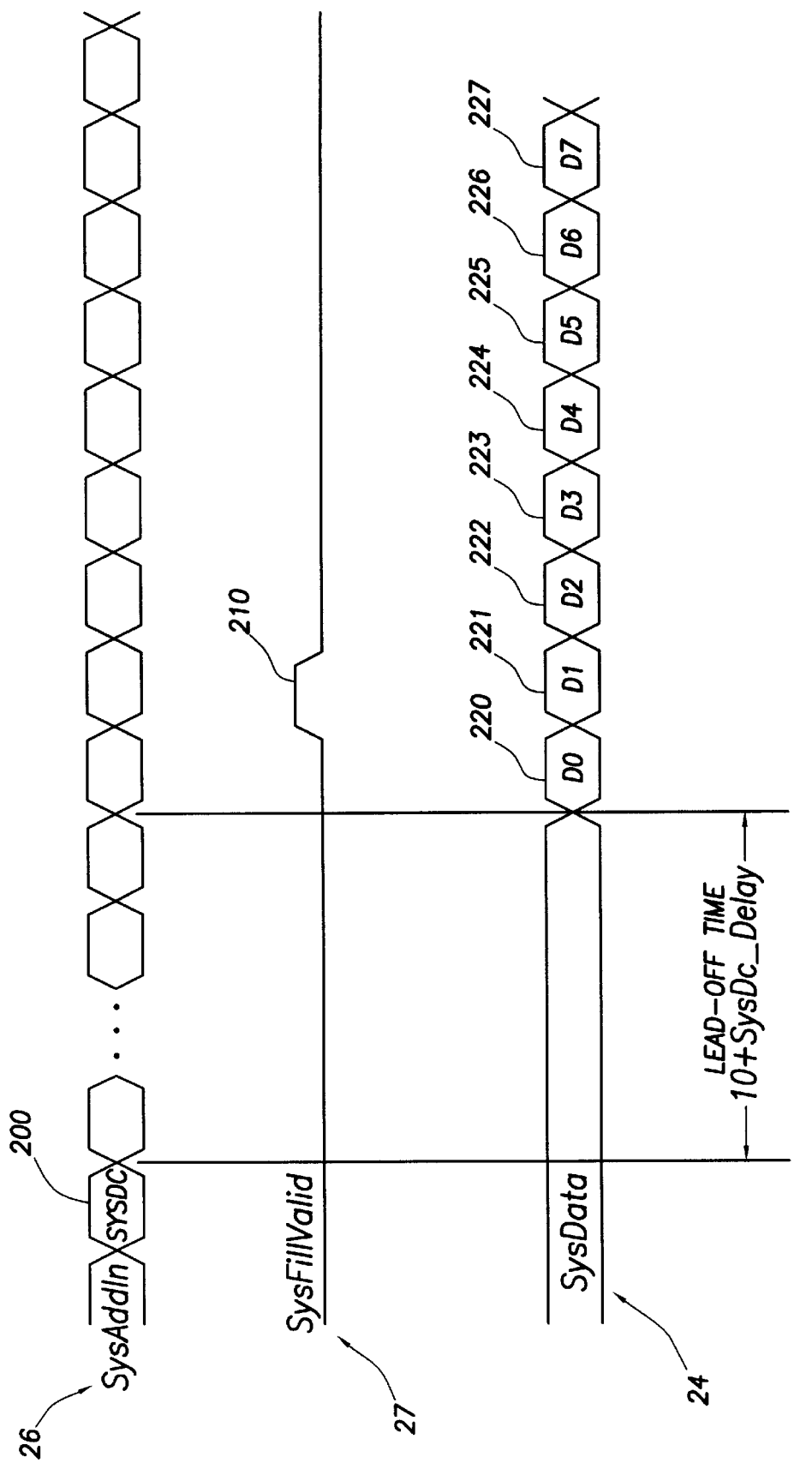
FIG. 4 is a timing diagram illustrating the timing signals of a speculative cache fill according to the present invention.

The preferred embodiment of the present invention will now be described, referring to the system block diagram of FIG. 3 and the timing diagram of FIG. 4. Referring to FIGS. 3 and 4, the memory access process starts with a memory reference 1 wherein the address determination unit 120 sends an address on address/command bus 26 to memory controller 25. Upon receiving the memory reference 1, the memory controller 25 immediately locates the data from memory 30 by retrieving data 10 in response to the address request 9. The memory controller 25 then initiates a System Data Response Command (SysDc) 4 to begin supplying the data from memory 30 to processor 20 on the data bus 24. Thus, the memory controller begins supplying the processor with data even though the memory controller does not yet know whether the copy of data in memory is the most recent version. However, the memory is most likely to be the location of the most recent copy.

FIG. 4 is a timing diagram showing the signals occurring during the speculative cache fill process according to the present invention, including signals occurring on the data bus 24 (SysData), address/command bus 26 (SysAddIn), and validation line 27 (SysFillValid).

As shown in FIG. 4, the SysDc Command is transmitted on the address/command bus 26 during cycle 200.

During the system response 4, the cache fill unit 122 begins receiving the data on data bus 24. The data setup stage 134 of the cache fill unit 122 primes the internal data structures of the cache fill unit 122 during a 10 cycle lead-off time. The microprocessor lead-off time needed to prime the cache fill unit is actually (10+SYSDC_DELAY)×GCLK cycles later than the assertion of the SysDC command. GCLK denotes the cycle time of the internal clock 35 (global) of the processor 40 and SYSDC_DELAY is the number of cycles of the internal clock 35 needed to make 10+SYSDC_DELAY a whole multiple of the system clock 36. This is the granularity at which the memory controller 25 can communicate with the processor 20.

Referring to FIG. 4, the data delivery stage 136 of the cache fill unit 122 delivers the data D0–D7 to the cache during clock cycles 220–227. Each data piece (i.e., D0–D7) consists of 64 bits. Thus, the data stream D0–D7 provides the exact number of bits to fill a 64-byte (8 bits/byte) cache block. This completes the memory access process in the situation where the data delivery in uninterrupted.

While the data is being transmitted to processor 20, the memory controller 25 is concurrently probing the other caches of the multiprocessor system 100 in order to determine if any of the other caches contain a more recent copy of the data.

The multiprocessor system 100 is tightly coupled, therefore having a single address space that all the processors 20 share. Thus the address of the memory reference 1 refers to a block of data in the main memory as well as to one or more copies of that data block which may be located in caches 22 and 23. The memory controller 25 needs a reasonable time limit in which to resolve the memory reference by locating the most recent version which may be in the main memory 30 or one of the caches 22 and 23. To locate the most recent version of the data, the memory controller 25 may issue probe commands 2 to one or more caches 22 and 23 of processors 20 to access the data corresponding to the address.

After the memory controller 25 has probed the caches containing data for the memory reference 1, the memory controller 25 determines whether the copy of data in memory is the most current copy. Based on this determination, the memory controller 25 provides the fill-validation signal 5 on line 27 to the validation unit 126 having a value indicating valid if the memory copy was the most recent copy, or of invalid if it was not the most recent copy. The fill-validation signal (SysFillValid) shown at cycle 210 can occur as late as the clock cycle 221 corresponding to transmission of the data piece D1.

The memory controller is allowed to deliver the fill-validation signal (SysfillValid) as late as D1 because of a mechanism internal to the processor designed to minimize disruption. To minimize disruption of internal processor resources, the processor accumulates 128 bits before delivering data to the internal caches and register files. Thus, the data for D0 and D1 (128 bits) is not delivered until the cycle corresponding to D1. Given this mechanism, the external system is allowed to deliver the fill-validation signal as late as the D1 cycle.

Referring to FIG. 4B, the fill-validation signal allows $$(10+SysDc\_Delay+Sys\_Clk\_Ratio) \times GCLK \text{ cycles} \qquad (1)$$

for the system to resolve all the possible memory references where Sys_Clk_Ratio is the additional time allowed for the transfer of the data D0. The ratio Sys_Clk_Ratio is ratio of the internal clock rate divided by the external clock rate. For example, consider an external system transferring data in a period three times the clock period GLCK. The transfer of data D0 for that system will take 3 GLCK periods. Thus, if SYSDC_Delay=2 GCLKS, then from Equation 1 the additional time gained for memory resolution is 15 GCLKS or 30 ns for a 500 MHz processor.

If the data is invalid, the cache fill abort unit 124 will cancel the data input in response to the validation unit 126 receiving an invalid signal 4 during clock cycle 210. In the event that the memory controller takes a longer interval of time than the time corresponding to the D1 cycle to determine the value of the fill-validation signal, the processor will assume the data is invalid and the cache fill abort unit 124 will cancel the data input. In the event of cancellation, the processor will clear the cache fill unit of data and retry retrieving the data.

In the case where the data is valid, the fill-validation signal 5 will be set to valid at cycle 210 and the data sequence D0–D8 will be loaded in on the data bus without interruption. In most instances, the version of the data from memory is correct and the present invention achieves its objective of reducing memory access time.

What is claimed is:

1. A method of speculatively filling a cache within a multiprocessor system, the system including a main memory coupled to a plurality of processors having a plurality of caches, comprising the steps of:

determining an address which identifies information located in the main memory, the address also identifying one or more versions of the information located in one or more of the plurality of caches, such address being determined to fill a designated cache with the information;

starting a process of filling the designated cache with the information located in the main memory;

locating one or more other versions of the information identified by the address in the plurality of caches; and determining validity of the information located in the main memory after locating the one or more other versions of the information, the initiation of the process of filling the designated cache with the information located in the main memory occurring in time before the time of determination of the validity of the information located in main memory.

2. The method of claim 1, further comprising:

canceling the process of filling the designated cache after determining the validity of the information located in the main memory to be invalid.

3. The method of claim 1, wherein:

the process of filling the designated cache has a primer stage wherein a pipeline associated with the filling process is prepared for delivery of the information located in the main memory followed by a delivery stage wherein the information located in the main memory is delivered to the designated cache, and further comprising the step of:

canceling the process of filling the designated cache upon determination that the information located in the main memory is invalid before the information located in the main memory is delivered to the designated cache in the delivery stage.

4. The method of claim 1, wherein:

the validity of the information located in the main memory is invalid if one of the other versions of the information is a more recent version than the information located in the main memory.

5. The method of claim 1, wherein:

the validity of the information located in the main memory is determined to be one of invalid and valid based upon a cache protocol.

6. The method of claim 1, wherein: the validity of the information located in the main memory is valid if the information located in the main memory is more recent than the other versions of the information.

7. The method of claim 1, further comprising:

completing the process of filling the designated cache without interruption after determining the validity of the information in the main memory to be valid.

8. A computing apparatus, for use within a computer system having a main memory and the computing apparatus connectable to a cache, comprising:

address circuitry for presenting an address to the main memory;

cache fill circuitry for receiving information from the main memory corresponding to the address and for speculatively filling a section of the cache with the information; and validation circuitry for receiving a validation signal having a value indicating whether the main memory information is valid or invalid, the cache fill circuitry initiating a speculative fill of the cache with the main memory information before the validation circuitry receives the validation signal.

9. The computing apparatus of claim 8, wherein:

the computing apparatus further includes the cache.

10. The computing apparatus of claim 8, wherein:

the cache is located external to the computing apparatus.

11. The computing apparatus of claim 8, further comprising:

cache fill abort circuitry for canceling the filling of the section of the cache with the main memory information if the value of the validation signal indicates the main memory information is invalid, or for continuing the filling of the section of cache if the value of the validation signal indicates the main memory information is valid, the value of the validation signal being determined at a point in time after the point in time the cache fill circuitry begins filling the cache with information, the cache fill thereby being speculative.

12. The computing apparatus of claim 11, wherein:

the cache fill circuitry is configured as a pipeline, and includes:

a data setup stage for preparing the main memory information for delivery to the cache; and a data delivery stage for receiving the main memory information from the data setup stage and delivering the main memory information to the cache, wherein if the value of the validation signal indicates the main memory information is invalid, the process of filling the cache is canceled by the cache fill abort circuitry before the information is received by the information delivery stage.

13. The computing apparatus of claim 8, further comprising:

a memory controller for receiving the address from the address circuitry, locating the main memory information corresponding to the address and providing the main memory information to the cache fill circuitry.

14. The computing apparatus of claim 8, wherein:

the memory controller sets the value of the validation signal to indicate whether the main memory information is invalid or valid based upon a cache protocol.

15. The computing apparatus of claim 8, wherein:

the memory controller sets the value of the validation signal to indicate the main memory information is invalid if the main memory information is not a most recent version of information.

16. A multiprocessor system, comprising:

a main memory configured to store information;

a memory controller, coupled to the main memory; and a plurality of processors, each processor coupled to the memory controller and including:

a cache;

a system port configured to receive main memory information from the memory controller;

cache fill circuitry for filling a section of the cache with the main memory information;

validation circuitry for receiving a validation signal having a value indicating whether the main memory information is valid or invalid; and cache fill abort circuitry for canceling the filling of the section of the cache if the value of the validation signal indicates the main memory information is invalid, the value of the validation signal being determined at a point in time after the point in time when the cache fill circuitry begins the process of filling the cache with the main memory information, the cache fill thereby being speculative.

17. The multiprocessor system of claim 16, wherein:

the memory controller produces the main memory information by retrieving it from the main memory.

18. The multiprocessor system of claim 16, wherein:

the memory controller generates the validation signal.

19. The multiprocessor system of claim 16, wherein:

the memory controller generates the validation signal by setting the value of the validation signal to invalid if a more recent copy of the information than the main memory information is located in one of the other caches, or setting the value of the validation signal to valid if the copy of the information in memory is the most recent copy.

20. A computer system, comprising:

a memory reference unit for selecting an address identifying a selected section of information in a memory;

an address bus for supplying an external system with the address for the selected section of information;

an information bus for receiving the selected section of information from the external system in response to the address;

a cache for storing a plurality of sections of information from the memory;

a validation pin for receiving a validation signal indicating whether the selected section of information is valid or invalid according to a cache protocol; and cache fill circuitry for filling one of the sections of the cache with the selected section of information, the cache fill process being initiated before determination of the validation signal.

21. The computer system according to claim 20, further comprising:

cache fill abort circuitry for canceling the filling of the selected section of the cache if the validation signal indicates the information is invalid, the validation signal being determined at a point in time after the point in time when the cache fill circuitry begins filling the cache with information, the cache fill thereby being speculative.

* * * * *